US009417666B2

(12) United States Patent
Abraham et al.

(10) Patent No.: US 9,417,666 B2
(45) Date of Patent: Aug. 16, 2016

(54) USER AND DEVICE MOVEMENT BASED DISPLAY COMPENSATION

(71) Applicant: Microsoft Technology Licensing, LLC, Redmond, WA (US)

(72) Inventors: Robin Abraham, Redmond, WA (US); Andrew V. Fawcett, Seattle, WA (US)

(73) Assignee: Microsoft Technology Licesning, LLC, Redmond, WA (US)

( * ) Notice: Subject to any disclaimer, the term of this patent is extended or adjusted under 35 U.S.C. 154(b) by 67 days.

(21) Appl. No.: 13/655,753

(22) Filed: Oct. 19, 2012

(65) Prior Publication Data

US 2014/0111550 A1    Apr. 24, 2014

(51) Int. Cl.
*G09G 5/00* (2006.01)
*G06F 1/16* (2006.01)
*G06F 3/01* (2006.01)
*G06F 3/147* (2006.01)

(52) U.S. Cl.
CPC .............. *G06F 1/1694* (2013.01); *G06F 3/013* (2013.01); *G09G 5/00* (2013.01); *G06F 3/147* (2013.01); *G06F 2200/1637* (2013.01); *G06F 2203/04806* (2013.01); *G09G 2320/0261* (2013.01); *G09G 2340/045* (2013.01); *G09G 2340/0464* (2013.01); *G09G 2340/14* (2013.01); *G09G 2354/00* (2013.01)

(58) Field of Classification Search
CPC .............................................. G09G 2320/0261
USPC ......................................................... 345/648
See application file for complete search history.

(56) References Cited

U.S. PATENT DOCUMENTS

| | | | |
|---|---|---|---|
| 6,317,114 B1 | 11/2001 | Abali et al. | |
| 7,307,653 B2 | 12/2007 | Dutta | |
| 7,903,166 B2 * | 3/2011 | Daly | 348/333.12 |
| 7,946,921 B2 | 5/2011 | Ofek et al. | |
| 8,077,915 B2 | 12/2011 | Thorn | |
| 8,131,319 B2 | 3/2012 | Platzer | |

(Continued)

FOREIGN PATENT DOCUMENTS

| | | |
|---|---|---|
| JP | H08-247796 A | 9/1996 |
| JP | H10-69266 A | 3/1998 |

OTHER PUBLICATIONS

"International Search Report & Written Opinion for PCT Patent Application No. PCT/US2013/065741", Mailed Date: Jan. 9, 2014, Filed Date: Oct. 18, 2013, 12 Pages.

(Continued)

*Primary Examiner* — Barry Drennan
*Assistant Examiner* — Shivang Patel
(74) *Attorney, Agent, or Firm* — Micky Minhas

(57) ABSTRACT

A direction and distance of movement of a display device as well as of a user of the display device are determined. Based on these determined directions and distances of movement, compensation to apply to content displayed on the display device to compensate for movement of the user with respect to the device is determined and applied to the content. A portion of the display device at which the user is looking can also be detected. The compensation is applied to the content only if applying the compensation would not result in the portion being positioned beyond the display device. If applying the compensation would result in the portion being positioned beyond the display device then appropriate corrective action is taken, such as not applying the compensation to the content.

20 Claims, 9 Drawing Sheets

(56) References Cited

U.S. PATENT DOCUMENTS

| | | | |
|---|---|---|---|
| 8,209,635 B2* | 6/2012 | Thom | 715/863 |
| 2004/0100419 A1 | 5/2004 | Kato et al. | |
| 2006/0103624 A1 | 5/2006 | Ishito et al. | |
| 2008/0199049 A1 | 8/2008 | Daly | |
| 2010/0220290 A1 | 9/2010 | Chen et al. | |
| 2012/0036433 A1 | 2/2012 | Zimmer et al. | |
| 2012/0287163 A1* | 11/2012 | Djavaherian | 345/667 |

OTHER PUBLICATIONS

Bosco, et al., "Digital Video Stabilization through Curve Warping Techniques", Retrieved at <<http://ieeexplore.ieee.org/stamp/stamp.jsp?tp=&arnumber=4560078>>, IEEE Transactions on Consumer Electronics, vol. 54, No. 2, May 2008, pp. 220-224.

Rahmati, et al., "NoShake: Content Stabilization for Shaking Screens of Mobile Devices", Retrieved at <<http://www.ruf.rice.edu/~mobile/publications/rahmati09percom.pdf>>, International Conference on Pervasive Computing and Communications, PerCom, Mar. 9, 2009, pp. 1-6.

Kane, et al., "Getting off the Treadmill: Evaluating Walking Interfaces for Mobile Devices in Public Spaces", Retrieved at <<http://faculty.washington.edu/wobbrock/pubs/mobilehci-08.pdf>>, Proceedings of the 10th international conference on Human computer interaction with mobile devices and services, Sep. 2, 2008, pp. 10.

Mustonen, et al., "Examining Mobile Phone Text Legibility While Walking", Retrieved at <<http://www.sas.upenn.edu/~mariaol/files/Mustonen-et-al-2004-CHI2004-1243.pdf>>, CHI '04 extended abstracts on Human factors in computing systems, Apr. 24, 2004, pp. 1243-1246.

Barnard, Leon et al., "Capturing the Effects of Context on Human Performance in Mobile Computing Systems", Journal Personal and Ubiquitous Computing, vol. 11, Issue 2,(Jan. 2007), pp. 81-96.

Mizobuchi, Sachi et al., "Mobile Text Entry: Relationship between Walking Speed and Text Input Task Difficulty", In Proceedings of Mobile HCI 2005,(Sep. 2005), pp. 122-128.

* cited by examiner

USER AND DEVICE MOVEMENT BASED DISPLAY COMPENSATION

BACKGROUND

Portable computing devices such as tablet computers and wireless phones have become commonplace. These portable computing devices have many advantages, including being able to be easily used while the user is moving. Despite their advantages, portable computing devices are not without their problems. One such problem is that the computing device can oftentimes be moving relative to the user while the user is trying to view a display of the device. This movement can make it difficult for the user to follow the content displayed by the device, which can result in frustrating user experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a direction of movement and a distance of movement of a display device are determined, and a direction of movement and a distance of movement of a user of the display device are determined. Compensation to apply to content displayed on the display device to compensate for movement of the user with respect to the display device is also determined and applied to the content displayed on the display device. The compensation is based on the direction of movement of the display device, the distance of movement of the display device, the direction of movement of the user, and the distance of movement of the user.

In accordance with one or more aspects, compensation to apply to content displayed on a display device to compensate for movement of a user with respect to the display device is determined. The compensation is based on a direction of movement of the display device, a distance of movement of the display device, a direction of movement of the user, and a distance of movement of the user. A portion of the display device at which the user is looking is also detected. The compensation is applied to the content displayed on the display device if the portion of the display device at which the user is looking is a portion for which applying the compensation would not result in the content in the portion of the display device being positioned beyond the display device. However, a corrective action is taken if the portion of the display at which the user is looking is a portion for which applying the compensation would result in the content in the portion of the display device being positioned beyond the display device.

BRIEF DESCRIPTION OF THE DRAWINGS

The same numbers are used throughout the drawings to reference like features.

DETAILED DESCRIPTION

User and device movement based display compensation is discussed herein. A direction and distance of movement of a display device as well as of a user of the display device are determined. Based on these determined directions and distances of movement, compensation to apply to content displayed on the display device to compensate for movement of the user with respect to the device is determined and applied to the content. This compensation can include shifting the content (e.g., along an x and/or y dimension of a plane of the display device), and/or zooming the content in or out. A portion of the display device at which the user is looking can also be detected. The compensation is applied to the content only if applying the compensation would not result in the portion being positioned beyond the display device. If applying the compensation would result in the portion being positioned beyond the display device, then appropriate corrective action is taken such as not applying the compensation to the content.

Figure 1:
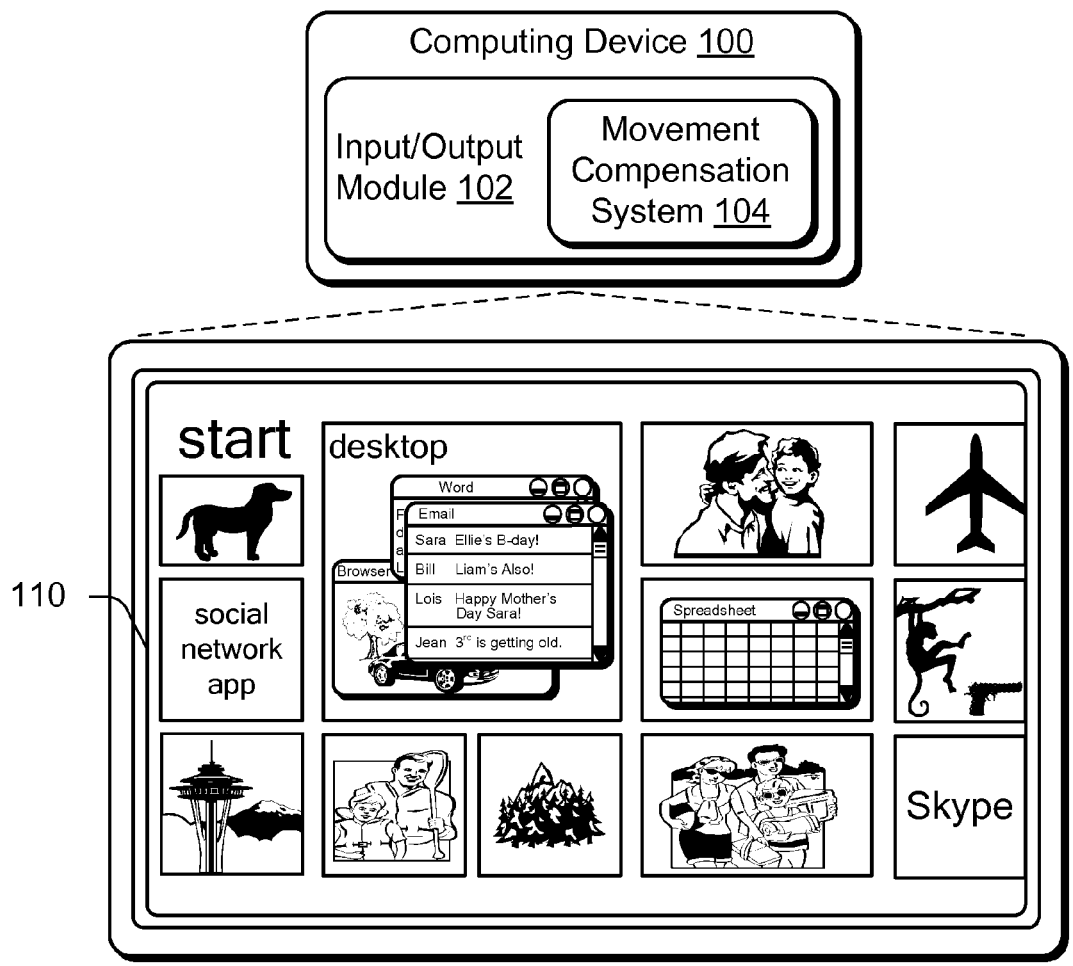
FIG. 1 illustrates an example computing device implementing the user and device movement based display compensation in accordance with one or more embodiments.

FIG. 1 illustrates an example computing device 100 implementing the user and device movement based display compensation in accordance with one or more embodiments. Computing device 100 is typically configured for mobile use, such as a mobile phone, a tablet computer, a laptop or netbook computer, a game console, an automotive computer, an e-reader or other content playback device, and so on. However, the techniques discussed herein are also applicable to multiple types of devices other than those for mobile use, and can be used with any of a variety of different devices. Computing device 100 can range from full resource devices with substantial memory and processor resources to low-resource devices with limited memory and/or processing resources. Computing device 100 can also relate to software that causes computing device 100 to perform one or more operations.

Computing device 100 is illustrated as including an input/output module 102 that includes a movement compensation system 104. Input/output module 102 is representative of functionality relating to processing of inputs and rendering outputs of computing device 100. A variety of different inputs may be processed by input/output module 102, such as inputs relating to functions that correspond to keys of an input device coupled to computing device 100 or keys of a virtual keyboard displayed by a display device 110 included as part of computing device 100, inputs that are gestures recognized through touchscreen functionality of display device 110 and that cause operations to be performed that correspond to the gestures, and so forth. As user inputs can be received via display device 110, display device 110 can also be referred to as an interactive display device. Movement compensation system 104 changes the display of content on display device 110, compensating for user movement with respect to display device 110 as discussed in more detail below.

Figure 2:
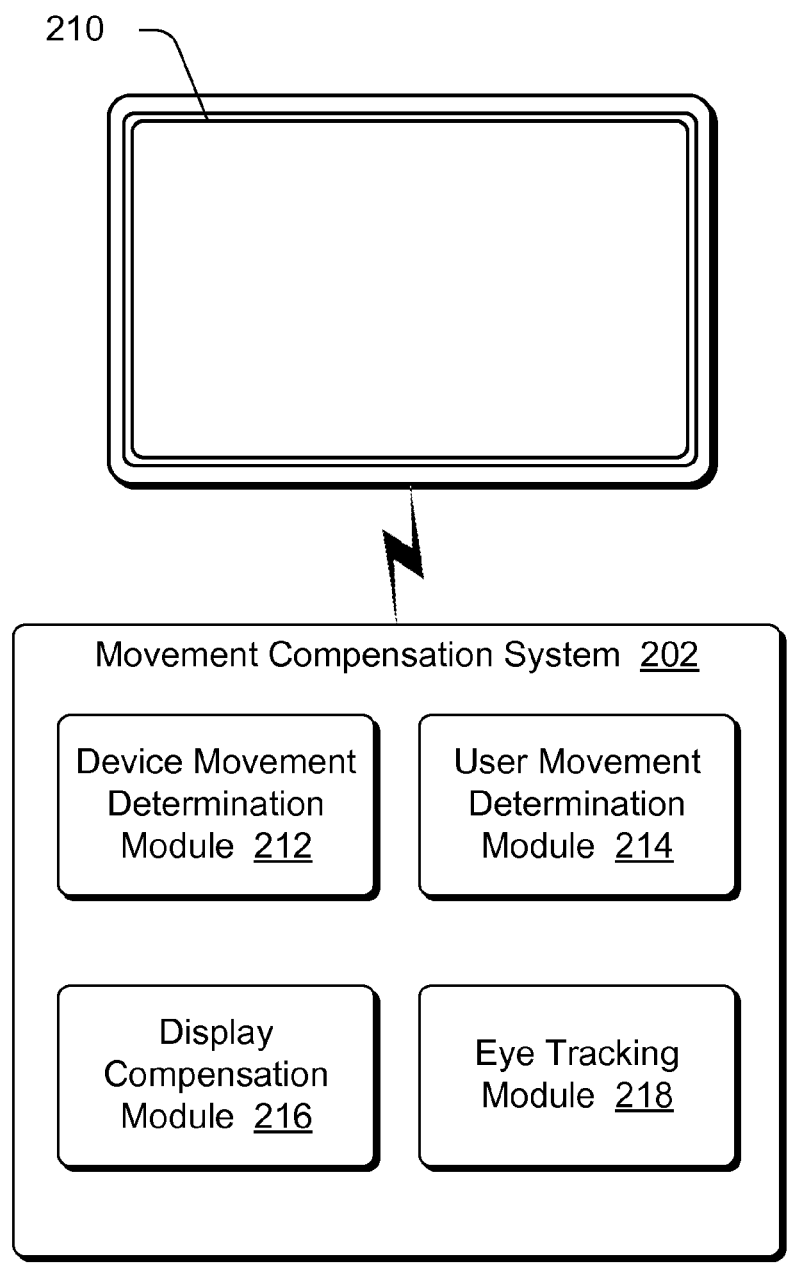
FIG. 2 illustrates another example computing device implementing the user and device movement based display compensation in accordance with one or more embodiments.

FIG. 2 illustrates another example computing device 200 implementing the user and device movement based display compensation in accordance with one or more embodiments. Computing device 200 may be configured in a variety of ways, analogous to computing device 100 of FIG. 1. Computing device 200 may also relate to software that causes computing device 200 to perform one or more operations.

Computing device 200 is illustrated as including a motion compensation system 202 and a display device 210. Display device 210 can be an interactive display device, analogous to display device 110 of FIG. 1. Movement compensation system 202 changes the display of content on display device 210 to compensate for user movement (particularly the user's head) with respect to display device 210. Movement compensation system 202 can be, for example, a movement compensation system 104 of FIG. 1.

Movement compensation system 202 includes a device movement determination module 212, a user movement determination module 214, a display compensation module 216, and an eye tracking module 218. Although particular functionality is discussed herein with reference to particular modules, it should be noted that the functionality of individual modules discussed herein can be separated into multiple modules, and/or at least some functionality of multiple modules discussed herein can be combined into a single module.

Device movement determination module 212 determines the movement of display device 210. Module 212 can determine the movement of display device 210 at regular or irregular intervals, such as every 10 milliseconds (ms), at a same frequency as content displayed on display device 210 is updated (e.g., at a refresh rate used by display device 210), in response to another event or input from another component or module, and so forth. Module 212 can include and/or receive input from one or more other components or modules to determine the movement of display device 210. These other components or modules can be included as part of display device 210 and/or as part of system 202 (e.g., housed in a same device as houses display device 210), or alternatively elsewhere (e.g., external to device 210 and system 202).

In one or more embodiments, device movement determination module 212 receives input from one or more accelerometer components (also referred to as simply accelerometers). An accelerometer provides an indication of a direction of movement (e.g., in two or three dimensions) and a distance (or amount) of movement. The direction can be specified in different manners, such as an angle (e.g., a particular number of degrees) from an origin, a compass direction, and so forth. The distance can also be specified in different manners, such as in micrometers, millimeters, centimeters, pixels, etc. Alternatively, other components can provide inputs to module 212 to determine the movement of display device 210. For example, module 212 can receive direction and/or distance of movement data from various MEMS (Microelectromechanical Systems or Microelectronicmechanical systems) sensors such as a compass, a gyroscope, a barometric altimeter, and so forth. By way of another example, module 212 can receive direction and/or distance of movement data from a Global Navigation Satellite System (GNSS) module that implements GNSS functionality using a variety of different technologies, such as the Global Positioning System (GPS), the Global Navigation Satellite System (GLONASS), the BeiDou (or Compass) navigation system, the Galileo positioning system, combinations thereof, and so forth.

Alternatively, device movement determination module 212 can receive data from one or more components and analyze the received data to determine the direction and/or distance of movement of display device 210. For example, module 212 can receive data that is captured images from a camera or other image capture device. Module 212 can determine based on the captured images (e.g., by tracking object locations in the images, by tracking locations of display device 210 in images captured from a camera external to display device 210, etc.) a direction and/or distance of movement of display device 210. Alternatively, the input received by module 212 can alternatively be other input rather than captured images, such as portions of captured images, data identifying objects in captured images, and so forth.

In one or more embodiments, device movement determination module 212 provides a device movement vector (also referred to as vector u) that indicates to display compensation module 216 the distance and direction of movement of display device 210. The device movement vector can have any number of dimensions, such as two dimensions (e.g., in the x and y dimensions of a plane of display device 210), three dimensions (e.g., in the x and y dimensions of a plane of display device 210, and in a z dimension approximately perpendicular to the plane that includes the x and y dimensions), and so forth. A plane of display device 210 refers to a plane approximately parallel to the display surface of display device 210 (e.g., the screen on which content is displayed). Module 212 can provide the device movement vector to display compensation module 216 in various manners, such as providing the device movement vector as a parameter of a procedure, function, application programming interface (API), etc., by storing the device movement vector in a location accessible to display compensation module 216, and so forth.

User movement determination module 214 determines the movement of a user of display device 210. Module 214 can determine the movement of a user of display device 210 at regular or irregular intervals, such as every 10 ms, at a same frequency as content displayed on display device 210 is updated (e.g., at a refresh rate used by display device 210), in response to another event or input from another component or module, and so forth. Module 214 typically determines the movement of a user of display device 210 at the same interval as device movement determination module 212 determines the movement of display device 210, although can alternatively determine the movement of the user at different intervals. Module 214 can include and/or receive input from one or more other components or modules to determine the movement of a user of display device 210. These other components or modules can be included as part of display device 210 and/or as part of system 202, or alternatively elsewhere (e.g., external to device 210 and system 202). Module 214 determines a direction of movement (e.g., in two or three dimensions) and a distance (or amount) of movement (e.g., in micrometers, millimeters, centimeters, pixels, etc.) based on the input it receives.

In one or more embodiments, user movement determination module 214 receives input from a camera or other image capture device. The input received by module 214 is typically captured images, but can alternatively be other input (e.g., portions of captured images, data identifying objects in captured images, and so forth). Module 214 analyzes the received input and tracks a location of a face of a user of display device 210. By tracking the location of the face of a user of display device 210, the direction and distance that the user has moved can be readily determined. Any of a variety of public and/or proprietary techniques can be used to detect the face of the user in different captured images. Based on the different locations of the detected face of the user in the different captured images, the direction of movement and distance of movement of the detected face can be readily determined. The direction can be specified in different manners, such as an angle (e.g., a particular number of degrees) from an origin, a compass direction, and so forth. The distance can also be specified in different manners, such as in micrometers, millimeters, centimeters, etc.

The direction of movement can be readily determined based on an origin or other reference point (e.g., relative to a field of view of the camera or other image capture device). The distance of movement can be readily determined given the size of the user's face or a particular object. User movement determination module 214 can be configured with the size of the user's face or other object, access another component or module that is configured with the size of the user's face or other object, receive a user input indicating the size of the user's face or other object, and so forth. For example, user movement determination module 214 can be configured with or have access to the sizes of known objects (such as eyes or portions thereof (e.g., pupil, iris)) and can readily determine the distance of movement based on the movement of the face relative to the size of such known objects.

Tracking the location of the face of the user provides indications of two-dimensional movement in the plane of display device 210 (e.g., the x and y dimensions). User movement determination module 214 can also track the size of the face of the user, allowing the distance the face of the user is away from the display device 210 to be readily determined. The face of the user will be larger when the user is closer to display device 210 than when the user is further away from display device 210. Given the change (e.g., increase or decrease in size of) the face of the user, the amount closer to display device 210 or further from display device 210 that the user moved can be readily determined.

Alternatively, user movement determination module 214 can detect and track objects other than faces. For example, module 214 can detect and track glasses worn by a user, a facial feature (e.g., eyes or mouth) of the user, jewelry or clothing worn by the user, and so forth. Additionally, situations can arise in which faces of multiple users are detected. Module 214 can resolve such situations in various manners, such as by tracking one of the multiple faces, tracking all of the multiple faces and combining (e.g., averaging) the direction and distance of movement determined for each face, and so forth.

Alternatively, other components can provide inputs to module 214 to determine the movement of a user of display device 210. For example, module 214 can receive data indicating direction and distance of movement of the user from one or more accelerators that are worn by the user (e.g., included in glasses or headphones worn by the user). By way of another example, module 214 can receive data indicating direction and distance of movement of the user from one or more other sensors of an immersive environment (e.g., games, museum exhibit walk-throughs, etc.) that track gestures of the user, movement of the user, and so forth.

In one or more embodiments, user movement determination module 212 provides a user movement vector (also referred to as vector v) that indicates to display compensation module 216 the distance and direction of movement of the user of display device 210. The user movement vector can have any number of dimensions, such as two dimensions (e.g., in the x and y dimensions of a plane of display device 210), three dimensions (e.g., in the x and y dimensions of a plane of display device 210, and in the z dimension approximately perpendicular to the plane that includes the x and y dimensions), and so forth. The user movement vector typically includes (but need not include) the same number of dimensions as the device movement vector provided to display compensation module 216 by device movement determination module 212. Module 214 can provide the user movement vector to display compensation module 216 in various manners, such as providing the user movement vector as a parameter of a procedure, function, API, etc., by storing the device movement vector in a location accessible to display compensation module 216, and so forth.

Display compensation module 216 receives an indication of the direction and distance of device movement (typically received as the device movement vector) from device movement determination module 212. Module 216 also receives an indication of the direction and distance of user movement (typically received as the user movement vector) from user movement determination module 214. Based on these received indications, display compensation module 216 determines an amount of compensation to apply to the content displayed on display device 210 to compensate for user movement with respect to display device 210. This compensation can include shifting the content a particular direction and amount in the plane of display device 210 and/or zooming (in or out) the content (also referred to as shifting the content a particular amount in a direction perpendicular to the plane of display device 210).

In one or more embodiments, display compensation module 216 generates a relative movement vector c by subtracting the user movement vector from the device movement vector (e.g., $c = u - v$). The relative movement vector identifies the movement of the device relative to the user. With two dimensions (e.g., along the x and y axis of the plane of display device 210), the relative movement vector c can be calculated as $c = (u_x - v_x)i + (u_y - v_y)j$, where $(u_x - v_x)$ refers to the magnitude in one dimension (e.g., along the x axis) of the user movement vector subtracted from the device movement vector, i refers to a unit vector in that one dimension (e.g., along the x axis), $(u_y - v_y)$ refers to the magnitude in another dimension (e.g., along the y axis) of the user movement vector subtracted from the device movement vector, and j refers to a unit vector in that other dimension (e.g., along the y axis).

Given the relative movement vector c, the compensation to apply to the content displayed by display device 210 can be readily determined by shifting or moving the content in the opposite direction and distance indicated by the relative movement vector c. For example, the relative movement vector c can include a component $c_x$ indicating the direction and distance of movement of the device relative to the user along one dimension (e.g., along the x axis), and a component $c_y$ indicating the direction and distance of movement of the device relative to the user along the other dimension (e.g., along the y axis). The compensation to apply to the content displayed by display device 210 is then $-c_x$ and $-c_y$.

For zooming in or out content, display compensation module 216 can be configured with or obtain from another component or module an indication of an amount to zoom in or out based on the amount closer to display device 210 or further from the display device 210 the user has moved. For example, module 216 can be configured with or obtain a table or formula indicating that if the user has moved a particular amount (e.g., a particular number of centimeters) closer to display device 210 that the content is to be zoomed out a particular amount (e.g., decreased in size by 10%), and that if the user has moved another particular amount further from display device 210 that the content is to be zoomed in a particular amount (e.g., increased in size by 25%). The amount to zoom in or out can be identified in different manners, such as increase or decrease the font size a particular percentage (e.g., 10%), increase or decrease the font size by a particular number (e.g., 2, such as increasing the font size from 10-point to 12-point), change the style or type, and so forth. Scaling (up or down) factors can also be applied to the content on the display as whole as well to keep the zooming effect consistent across various types of content (e.g., images, video, textual, etc.).

Figure 3:
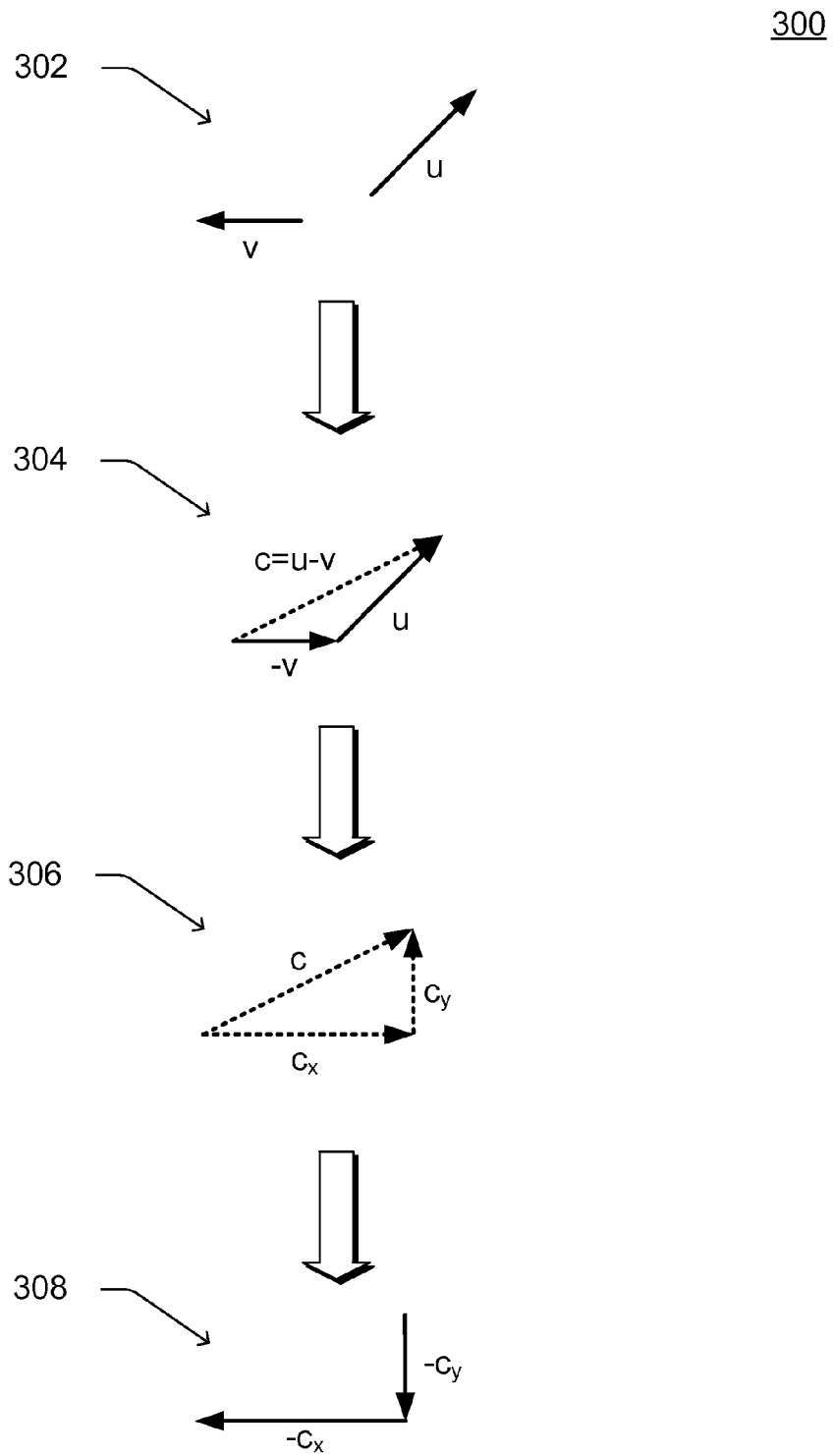
FIG. 3 illustrates an example of determining the compensation to apply to the content displayed in accordance with one or more embodiments.

FIG. 3 illustrates an example 300 of determining the compensation to apply to the content displayed in accordance with one or more embodiments. Two movement vectors are determined at 302: a user movement vector v and a device movement vector u. A relative movement vector c is determined at 304 as c=u−v. The relative movement vector c includes a component $c_x$ and a component $c_y$, as illustrated at 306. The compensation to apply to the content displayed by the display device is $-c_x$ and $-c_y$, as illustrated at 308.

In the example 300 of FIG. 3, two dimensions (x and y) are discussed. However, it should be noted that the user movement vector, the device movement vector, and the relative movement vector can include any number of elements as discussed above.

Figure 4:
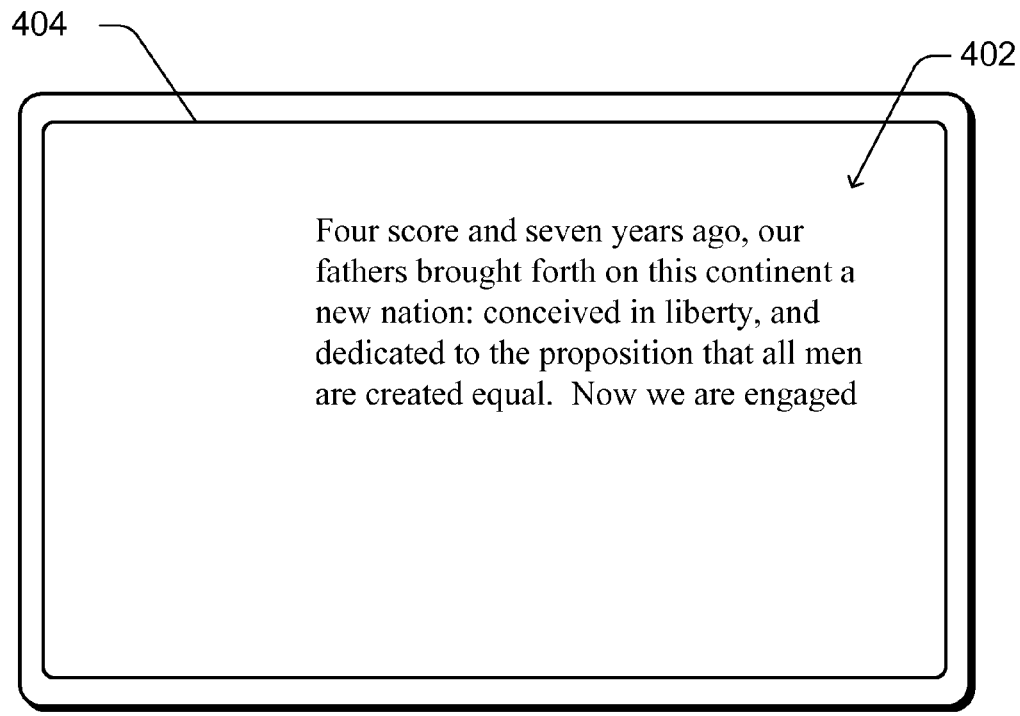
FIG. 4 illustrates example content being displayed without compensation on a display device in accordance with one or more embodiments.
Figure 5:
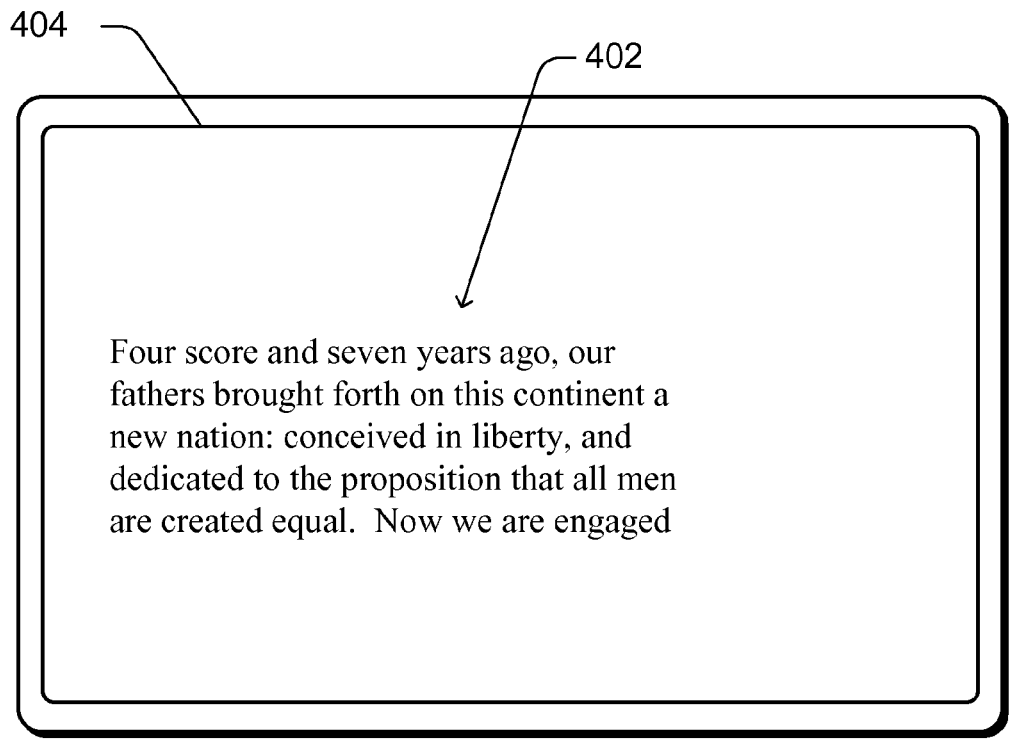
FIGS. 5 and 6 illustrate example content being displayed with compensation in accordance with one or more embodiments.
Figure 6:
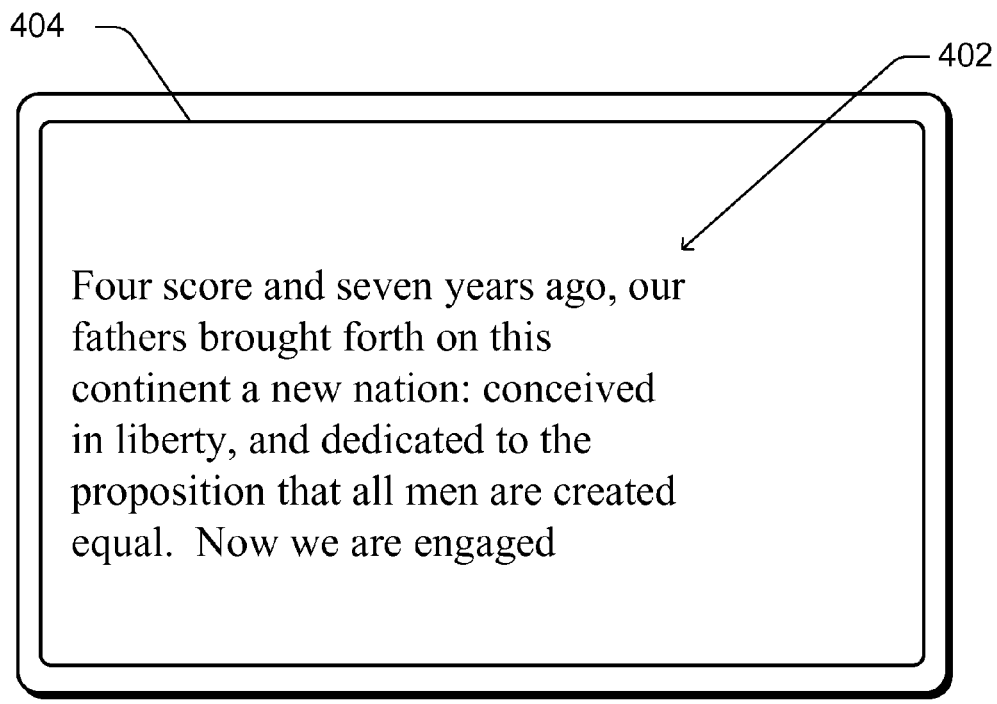

FIGS. 4-6 illustrate example content being displayed on a display device in accordance with one or more embodiments. FIG. 4 illustrates example content 402 being displayed without compensation on a display device 404. FIG. 5 illustrates example content 402 being displayed with compensation, the content 402 having been shifted by an amount (e.g., $-c_x$ and $-c_y$ as discussed above). FIG. 6 illustrates example content 402 being displayed with compensation, the content 402 having been shifted by an amount (e.g., $-c_x$ and $-c_y$ as discussed above) as well as zoomed in to account for movement in a third dimension (e.g., along a z axis that is approximately perpendicular to the plane of the display device, which includes the x axis and the y axis).

Returning to FIG. 2, movement compensation system 202 optionally includes an eye tracking module 218. Eye tracking module 218 identifies the portion of display device 210 at which a user of display device 210 is looking. Module 218 can determine the portion of display device 210 at which a user is looking at regular or irregular intervals, such as every 10 ms, at a same frequency as content displayed on display device 210 is updated (e.g., at a refresh rate used by display device 210), in response to another event or input from another component or module, and so forth. Module 218 typically determines the portion of display device 210 at which a user is looking at the same interval as device movement determination module 212 determines the movement of display device 210 and/or user movement determination module 214 determines the movement of the user of display device 210, although can alternatively determine the portion of display device 210 at which a user is looking at different intervals. Eye tracking module 218 can include and/or receive input from one or more other components or modules to determine the portion of display device 210 at which a user is looking. These other components or modules can be included as part of display device 210 and/or as part of system 202, or alternatively elsewhere (e.g., external to device 210 and system 202).

In one or more embodiments, user eye tracking module 218 receives input from a camera or other image capture device. The input received by module 218 is typically captured images, but can alternatively be other input (e.g., portions of captured images, data identifying objects (e.g., eyes) in captured images, and so forth). Module 218 analyzes the received input and determines the portion of display device 210 at which the user is looking based on the eyes of the user. Any of a variety of public and/or proprietary techniques can be used to determine the portion of display device 210 at which the user is looking.

In one or more embodiments, eye tracking module 218 provides to display compensation module 216 an indication of the portion of display device 210 at which the user is looking. Module 218 can provide the indication to display compensation module 216 in various manners, such as providing the indication as a parameter of a procedure, function, API, etc., by storing the indication in a location accessible to display compensation module 216, and so forth.

If the compensation as determined based on the relative movement vector c as discussed above would result in the content at the portion of display device 210 at which the user is looking being positioned external to or beyond the display device, then appropriate corrective action is taken by display compensation module 216. For example, assume the user is looking at a portion of display device 210 that is along the left edge (e.g., within 1 centimeter of the left edge) of display device 210, and that the compensation indicates that the content is to be shifted 2 centimeters to the left. If the content were shifted to the left 2 centimeters, then the content in the portion of the display at which the user is looking would be shifted off the display (e.g., by approximately 1 centimeter).

In one or more embodiments, the appropriate corrective action is to not shift the content. Thus, rather than shifting the content to compensate for movement of the device and user, module 216 does not shift the content if the shifting would result in the content at the portion of display device 210 at which the user is looking being positioned external to or beyond display device 210. Alternatively, other corrective actions can be taken. For example, the appropriate corrective action can be to shift the content by only part (e.g., one-third or one-half) of the compensation indicated by the relative movement vector c, or to shift the content in only one dimension (e.g., shift the content in the x dimension but not the y dimension) indicated by the relative movement vector c.

Figure 7:
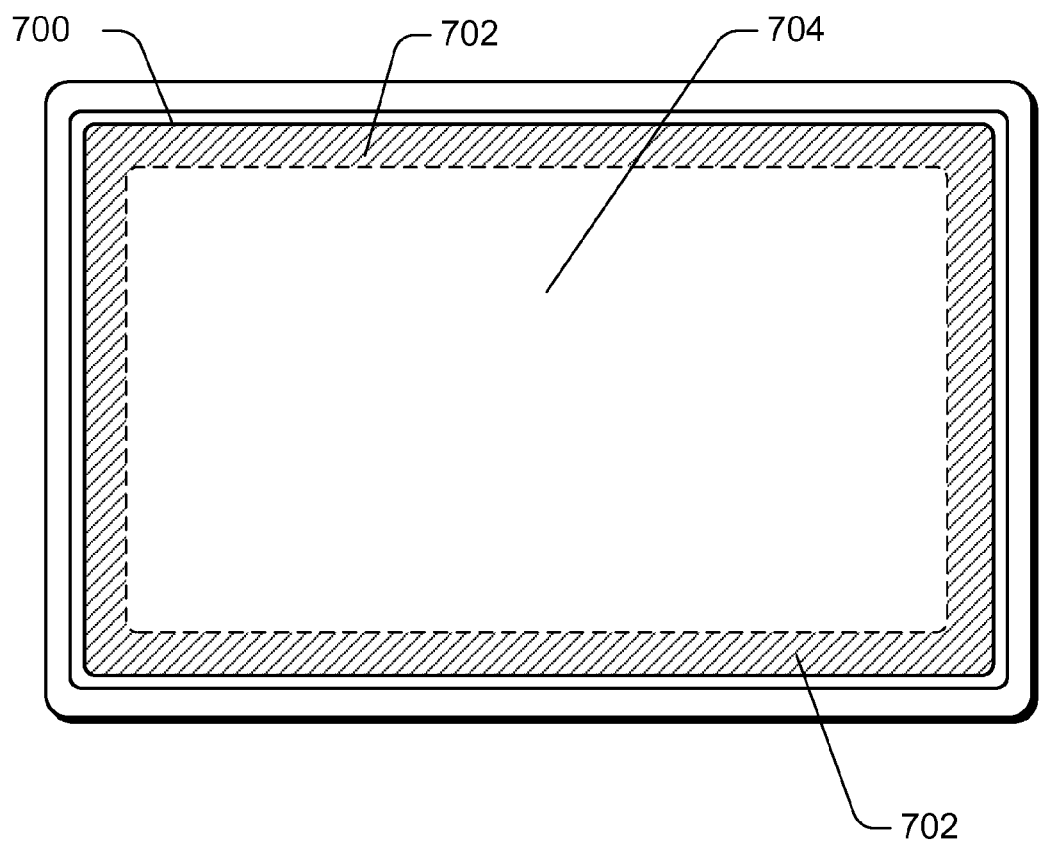
FIG. 7 illustrates an example of portions of a display device for which compensation would result in the content being positioned beyond the display device in accordance with one or more embodiments.

FIG. 7 illustrates an example of portions of a display device for which compensation would result in the content being positioned beyond the display device in accordance with one or more embodiments. FIG. 7 illustrates a display device 700 with a portion 702 and a portion 704. If the portion of display device 700 at which the user is looking is portion 704, then compensation would not result in the content in the portion at which the user is looking being positioned beyond the display device, and the display compensation module shifts the content displayed by display device 700 as discussed above. However, if the portion of display device 700 at which the user is looking is portion 702, then compensation would result in the content in the portion at which the user is looking being positioned beyond the display device, the display compensation module does not shift the content displayed by display device 700.

The portion 702 can be determined in a variety of different manners. In one or more embodiments, the portion 702 is determined by the display compensation module (or another component or module) empirically based on the amount of shifting of content that is typically (e.g., at least a threshold amount of time) performed. For example, if the amount of shift is typically no more than 2 centimeters in any direction, then the portion 702 can be a band 2 centimeters wide around the perimeter of display device 700. In other embodiments, the display compensation module can be configured with an indication of portion 702 based on the desires of a designer or distributor of display device 700.

In other embodiments, the portion 702 is determined by the display compensation module (or another component or module) based on the compensation determined by the display compensation module. The portion 702 is then a band around the perimeter of display device 700 that is an amount of compensation determined based on the relative movement vector c discussed above. For example, if based on the relative movement vector c the content is to be shifted 2 centimeters to the left and 1 centimeter down (in a plane approximately parallel to the plane of the device), then the portion 702 is a band 2 centimeters wide along the left-hand side of display device 700, and a band 1 centimeter wide along the bottom of display device 700. The band can optionally continue around the remainder of the perimeter of display device 700 (e.g., along the right-hand side and the top of display device 700).

Figure 8:
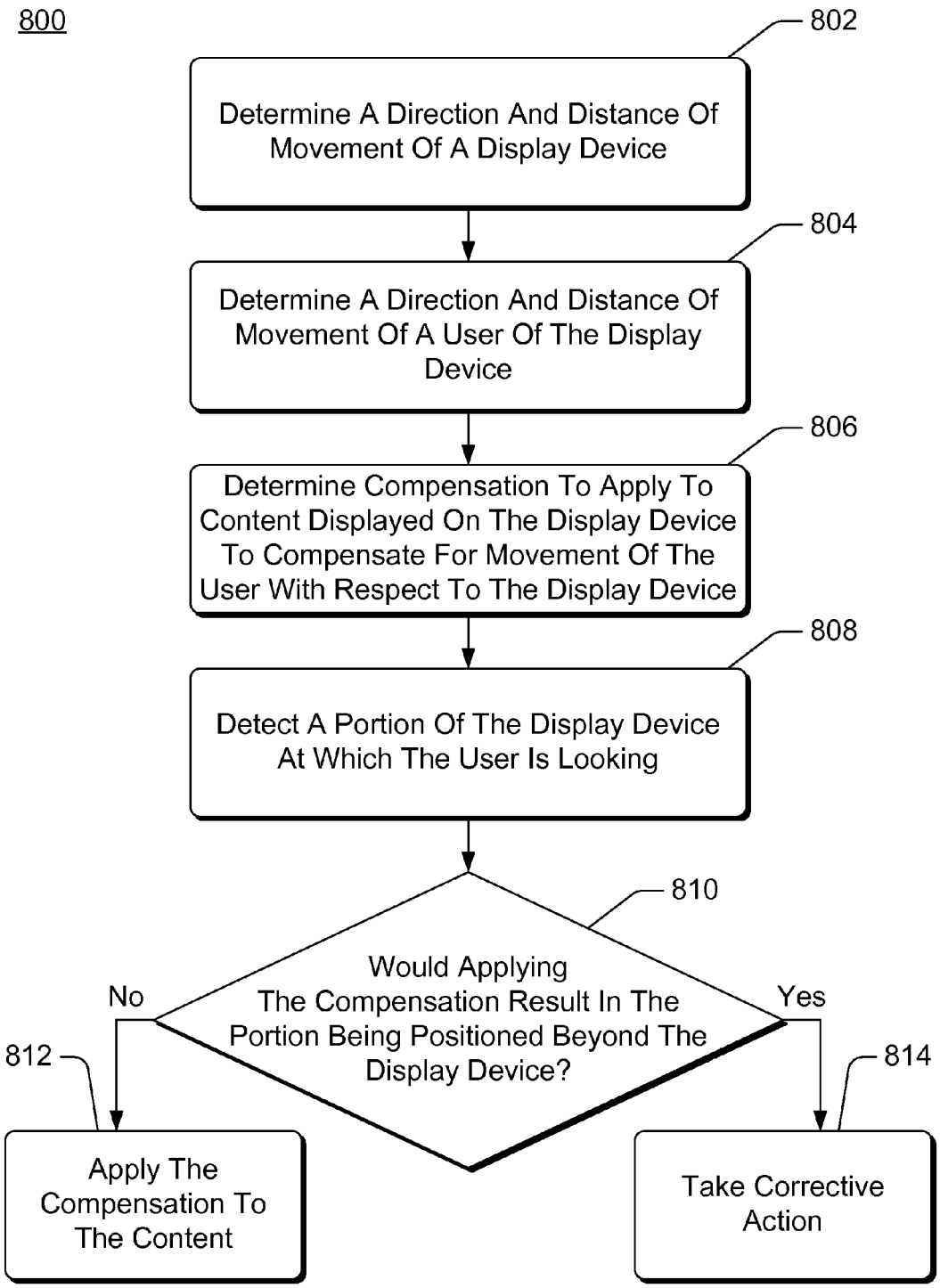
FIG. 8 is a flowchart illustrating an example process for a device implementing the user and device movement based display compensation in accordance with one or more embodiments.

FIG. 8 is a flowchart illustrating an example process 800 for a device implementing the user and device movement based display compensation in accordance with one or more embodiments. Process 800 is carried out by a movement compensation system, such as system 104 of FIG. 1 or system 202 of FIG. 2, and can be implemented in software, firmware, hardware, or combinations thereof. Process 800 is shown as a set of acts and is not limited to the order shown for performing the operations of the various acts. Process 800 is an example process for implementing the user and device movement based display compensation; additional discussions of implementing the user and device movement based display compensation are included herein with reference to different figures.

In process 800, a direction and distance of movement of a display device is determined (act 802). This direction and distance of movement can be determined in different manners, such as using one or more accelerometers as discussed above.

A direction and distance of movement of a user of the display device is also determined (act 804). This direction and distance of movement can be determined in different manners, such as using face detection and tracking as discussed above.

Compensation to apply to content displayed on the display device to compensate for movement of the user with respect to the display device is determined (act 806). This compensation can be determined in different manners, such as being values in one or more dimensions that are opposite of the values of elements of a relative movement vector as discussed above.

A portion of the display device at which the user is looking is also detected (act 808). This portion can be determined in different manners, such as by tracking the eyes of the user as discussed above.

Process 800 then proceeds based on whether applying the compensation would result in the portion at which the user is looking being positioned beyond the display device (act 810). If applying the compensation would not result in the portion at which the user is looking being positioned beyond the display device, then the compensation is applied to the content (act 812). The compensation can be applied to the content in different manners, such as shifting and/or zooming the content as discussed above. However, if applying the compensation would result in the portion at which the user is looking being positioned beyond the display device, then corrective action is taken (act 814). Various different corrective actions can be taken as discussed above, such as not applying the compensation to the content or applying only part of the compensation to the content.

In one or more embodiments, acts 808, 810, and 814 are optional and need not be performed. In such embodiments, the compensation determined in act 806 is applied to content without regard for the portion of the display device at which the user is looking.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 9:
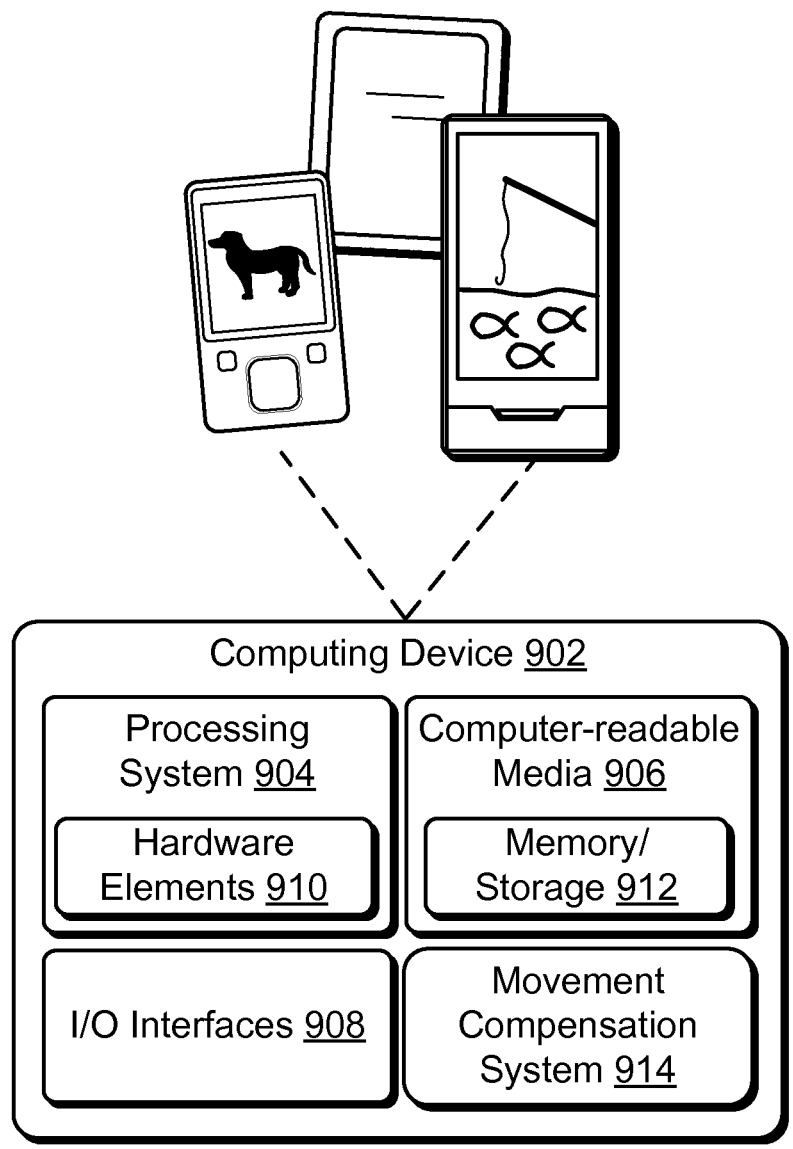
FIG. 9 illustrates an example computing device that is representative of one or more computing systems and/or devices that may implement the various techniques described herein.

FIG. 9 illustrates an example computing device 902 that is representative of one or more computing systems and/or devices that may implement the various techniques described herein. The computing device 902 may, for example, be configured to assume a mobile configuration through use of a housing formed and sized to be grasped and carried by one or more hands of a user, illustrated examples of which include a mobile phone, mobile game and music device, and tablet computer although other examples are also contemplated.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone to receive voice or other audible inputs, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways to support user interaction.

Movement compensation system 914 is representative of a movement compensation system that leverages the various techniques discussed herein to compensate for user movement with respect to a display device. Movement compensation system 914 can be, for example, a movement compensation system 104 of FIG. 1 or a movement compensation system 202 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or storage of information that is tangible in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

Furthermore, although illustrated as a single computing device, computing device 902 can be coupled to one or more additional computing devices via the Internet or other data communication network. These additional computing devices can be, for example, a cloud of one or more server computers. Various aspects of the movement compensation system 914 and/or other modules of computing device 902 can be provided by and/or processing performed on one or more servers or other computing devices that are remote from computing device 902.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   determining, by a display device, a direction of movement and a distance of movement of the display device;
   determining, by the display device, a direction of movement and a distance of movement of a user of the display device;
   determining, by the display device, compensation to apply to content displayed on the display device to compensate for movement of the user with respect to the display device, the compensation being based on the direction of movement of the display device, the distance of movement of the display device, the direction of movement of the user, and the distance of movement of the user;

detecting, by the display device, a portion of the display device at which the user is looking;

determining whether applying the compensation would result in the content displayed in the portion of the display device at which the user is looking being positioned beyond a perimeter of the display device;

responsive to determining that applying the compensation would result in the content displayed in the portion of the display device at which the user is looking being positioned beyond the perimeter of the display device, taking corrective action to prevent the content displayed in the portion of the display device at which the user is looking from being positioned beyond the perimeter of the display device; and applying, by the display device, the compensation to the content displayed on the display device.

2. A method as recited in claim 1, the corrective action comprising not applying the compensation to the content displayed on the display device.

3. A method as recited in claim 1, the corrective action comprising applying only part of the compensation to the content displayed on the display device.

4. A method as recited in claim 1, the compensation comprising shifting the content in a plane approximately parallel to a plane of the display device.

5. A method as recited in claim 1, the compensation comprising zooming in or zooming out the content.

6. A method as recited in claim 1, the compensation comprising shifting the content in a plane approximately parallel to a plane of the display device and further comprising zooming in or zooming out the content.

7. A method as recited in claim 1, further comprising:
generating, by the display device, a device movement vector identifying the direction of movement and the distance of movement of the display device;
generating, by the display device, a user movement vector identifying the direction of movement and the distance of movement of the user;
generating, by the display device, a relative movement vector by subtracting the user movement vector from the device movement vector; and
using the relative movement vector to determine the compensation.

8. A method as recited in claim 7, the relative movement vector including an x dimension element in a plane of the display device and a y dimension element in the plane of the display device, and the using the relative movement vector to determine the compensation comprising determining an amount to shift the content in the x dimension as the opposite of a value of the x dimension element and determining an amount to shift the content in the y dimension as the opposite of a value of the y dimension element.

9. A method as recited in claim 1, further comprising determining the direction of movement and distance of movement of the user based on detection of a face of the user in images captured by a camera included in a device that houses the display device.

10. A method as recited in claim 9, further comprising determining the direction of movement and distance of movement of the device based on one or more accelerometers included in the device that houses the display device.

11. A method as recited in claim 1, the determining the direction of movement and the distance of movement of the display device performed at 10 millisecond intervals.

12. A method as recited in claim 1, the corrective action comprising reducing an amount of shifting to apply to the content.

13. A method as recited in claim 1, the corrective action comprising reducing an amount of zooming to apply to the content.

14. One or more computer-readable storage media having stored thereon multiple instructions that, when executed by one or more processors of a computing device, cause the one or more processors to:
determine compensation to apply to content displayed on a display device to compensate for movement of a user with respect to the display device, the compensation being based on a direction of movement of the display device, a distance of movement of the display device, a direction of movement of the user, and a distance of movement of the user;
detect a portion of the display device at which the user is looking;
determine whether applying the compensation to the content would result in the content displayed in the portion of the display device being positioned beyond a perimeter of the display device;
apply the compensation to the content displayed on the display device in response to determining that applying the compensation would not result in the content in the portion of the display device being positioned beyond the perimeter of the display device; and
take corrective action in response to determining that applying the compensation would result in the content in the portion of the display device being positioned beyond the perimeter of the display device.

15. One or more computer-readable storage media as recited in claim 14, the corrective action comprising not applying the compensation to the content displayed on the display device.

16. One or more computer-readable storage media as recited in claim 14, the compensation comprising shifting the content in a plane approximately parallel to a plane of the display device and further comprising zooming in or zooming out the content displayed on the display device.

17. One or more computer-readable storage media as recited in claim 14, wherein the multiple instructions further cause the one or more processors to:
generate a device movement vector identifying the direction of movement and the distance of movement of the display device;
generate a user movement vector identifying the direction of movement and the distance of movement of the user;
generate a relative movement vector by subtracting the user movement vector from the device movement vector; and
use the relative movement vector to determine the compensation.

18. One or more computer-readable storage media as recited in claim 17, the relative movement vector including an x dimension element in a plane of the display device and a y dimension element in the plane of the display device, and wherein to use the relative movement vector to determine the compensation is to determine an amount to shift the content in the x dimension as the opposite of a value of the x dimension element and determine an amount to shift the content in the y dimension as the opposite of a value of the y dimension element.

19. One or more computer-readable storage media as recited in claim 14, wherein the multiple instructions further cause the one or more processors to determine both the direction of movement of the user and distance of movement of the user based on detection of a face of the user in images captured by a camera included in the computing device, the computing device also housing the display device.

20. A computing device comprising:
one or more processors; and
one or more computer-readable storage media having stored thereon multiple instructions of a movement compensation system that, when executed by the one or more processors, cause the one or more processors to:
determine a direction of movement and a distance of movement of a display device;
determine a direction of movement and a distance of movement of a user of the display device;
determine compensation to apply to content displayed on the display device to compensate for movement of the user with respect to the display device, the compensation being based on the direction of movement of the user with respect to the display device, the distance of movement of the display device, the direction of movement of the user, and the distance of movement of the user;
detect a portion of the display device at which the user is looking;
apply, in response to a determination that applying the compensation would not result in content in the portion of the display device being positioned external to a perimeter of the display device, compensation to the content displayed on the display device; and
display the content without compensation in response to a determination that applying the compensation would result in content in the portion of the display device being positioned external to the perimeter of the display device.

* * * * *